(12) United States Patent
Schulte-Ladbeck

(10) Patent No.: US 7,678,492 B2
(45) Date of Patent: Mar. 16, 2010

(54) BATTERY VENT AND PRESSURE BLOWOUT RELIEF FRIT

(75) Inventor: Bernd Schulte-Ladbeck, Houston, TX (US)

(73) Assignee: Compagnie Plastic Omnium, Lyons (FR)

(*) Notice: Subject to any disclaimer, the term of this patent is extended or adjusted under 35 U.S.C. 154(b) by 0 days.

(21) Appl. No.: 10/435,913

(22) Filed: May 12, 2003

(65) Prior Publication Data

US 2003/0215698 A1 Nov. 20, 2003

Related U.S. Application Data

(60) Provisional application No. 60/381,282, filed on May 18, 2002.

(51) Int. Cl.
*H01M 2/12* (2006.01)

(52) U.S. Cl. ............... 429/56; 429/55; 429/72

(58) Field of Classification Search ............. 429/53–56, 429/72, 82–89
See application file for complete search history.

(56) References Cited

U.S. PATENT DOCUMENTS

| 3,507,708 | A |   | 4/1970  | Vienaud |       |
|-----------|---|---|---------|---------|-------|
| 5,348,570 | A |   | 9/1994  | Ruppert |       |
| 5,362,577 | A | * | 11/1994 | Pedicini | 429/27 |
| 5,422,199 | A |   | 6/1995  | Adams   |       |
| 5,981,099 | A |   | 11/1999 | Bourbeau |      |
| 6,092,812 | A |   | 7/2000  | Ursel et al. |   |
| 6,110,617 | A | * | 8/2000  | Feres   | 429/86 |
| 6,294,282 | B1 |  | 9/2001  | Misra et al. |   |
| 6,485,860 | B2 |  | 11/2002 | Fossati et al. | |
| 6,521,024 | B1 |  | 2/2003  | Akahori et al. | |

FOREIGN PATENT DOCUMENTS

| DE | 19642238      | * | 12/1997 |
|----|---------------|---|---------|
| JP | 62-098559 A   | * | 5/1987  |
| WO | WO 96//08048  | * | 3/1996  |

OTHER PUBLICATIONS

JPO English abstract for JP 62-098559 A (publication date of May 1987).*
Datasheet for US Patent drawn to polytetrafluoroethylene (e.g. GORTEX) [online]. PATENTEC, 1999 [retrieved on Nov. 14, 2004]. Retrieved from the Internet: <URL:. http://www.patentec.com/data/class/defs/2/904.html>.*
Data Sheet for O-rings ("O-Ring Advantages". [retrieved on Nov. 14, 2004]. Retrieved from the Internet : <URL: http://www.mcnallyinstitute.com/CDweb/o-html/o004.htm>).*
Altavista's Babelfish machine translation for DE 19642238 (publication date of Dec. 1997).*
Performance Plastics Products—3P—2 pgs—downloaded Dec. 25, 2003 http://www.plasticomnium.com/groupe/Activities/AC.02.htm.
3P North America Automotive Products—1 pg http://www.3pusa.com/autoprod/—downloaded Feb. 25, 2003.

* cited by examiner

*Primary Examiner*—Tracy Dove
(74) *Attorney, Agent, or Firm*—Oliff & Berridge, PLC

(57) ABSTRACT

The present invention is directed to an improvement in a battery cover having a vent opening, the improvement is a frit that has two functions; namely, it acts to allow gases to escape while preventing liquid to escape and in addition acts as a blowout disk when a pressure within the battery exceeds a predetermined pressure that blows the frit out of the cover preventing the explosion of the battery.

17 Claims, 6 Drawing Sheets

BATTERY VENT AND PRESSURE BLOWOUT RELIEF FRIT

CROSS-REFERENCE TO RELATED APPLICATIONS

This application claims the benefit of U.S. Provisional Application No. 60/381,282, filed May 18, 2002 and entitled Battery Vent and Pressure Relief.

BACKGROUND OF THE INVENTION

U.S. Pat. No. 6,110,617 discloses a flooded lead acid battery including a casing enclosing a plurality of cells having liquid electrolyte therein and a cover incorporating negative and positive terminals and having a plurality of vent holes. The vent holes are covered by at least one closure having a vent cavity therein, and a relatively rigid porous polytetrafluoroethylene disc having hydrophobic properties is sealed within the vent cavity.

U.S. Pat. No. 3,507,708 discloses a membrane made of a microporous piece of a perhalogenated aliphatic hydrocarbon, preferably polytetrafluoroethylene or polytrifluoromonochloroethylene, with respect to which the angle of wetting or contact of the liquid to be stopped is substantially greater than 90°. This membrane can form a part of a stopper for primary or secondary cells for preventing the escape of the liquid electrolyte from such cells, while permitting the escape of gases produced in the cells.

U.S. Pat. No. 5,348,570 discloses a venting mechanism that includes three members. A baffle is located within the bore of the second member. A Gortex film and wire mesh are retained within the bore of the third member by a rolled lip. The baffle and Gortex film act to maintain liquid on one side of the breather while allowing gases to freely pass there through.

U.S. Pat. No. 5,422,199 discloses a venting system for an electric storage battery that comprises a venting plug associated with each process hole. The venting plugs have a generally cylindrical side wall, a closed upper end, an open lower end, and a central cavity. A vent aperture is located in the side wall of the venting plug and is in gaseous communication with the manifold and the venting plug central cavity. A baffle is positioned within the venting plug central cavity between the vent aperture and the lower end of the venting plug. The baffle is adapted to allow the passage of gases and to retard the passage of electrolyte from the cell cavity through the venting plug central cavity.

U.S. Pat. No. 5,981,099 discloses a storage battery with a number of cells having an access port to each cell. Positioned in each access port is a valve. The valve generally includes a cap housing, a sealing O-ring, a flame arrester and a valve member.

U.S. Pat. No. 6,092,812 discloses a cover element for an opening in the body of a motor vehicle, such as a window or sunroof, that has a ventilation opening for air exchange between the interior and exterior of the vehicle. A permeable membrane permits passage of air but prevents an entry of water to the interior. The membrane is secured by a sealing ring.

U.S. Pat. No. 6,521,024 discloses a seal plate with a separate explosion preventing valve and a breather opening. A special breaking plate is employed in the explosion preventing valve opening.

SUMMARY OF THE INVENTION

The present invention is directed to an improvement in a battery cover having a vent opening, the improvement is a frit that has two functions; namely, it acts to allow gases to escape while preventing liquid to escape and in addition acts as a blowout disk when a pressure within the battery exceeds a predetermined pressure that blows the frit out of the cover preventing the explosion of the battery.

BRIEF DESCRIPTION OF THE PRESENT INVENTION

Figure 1:
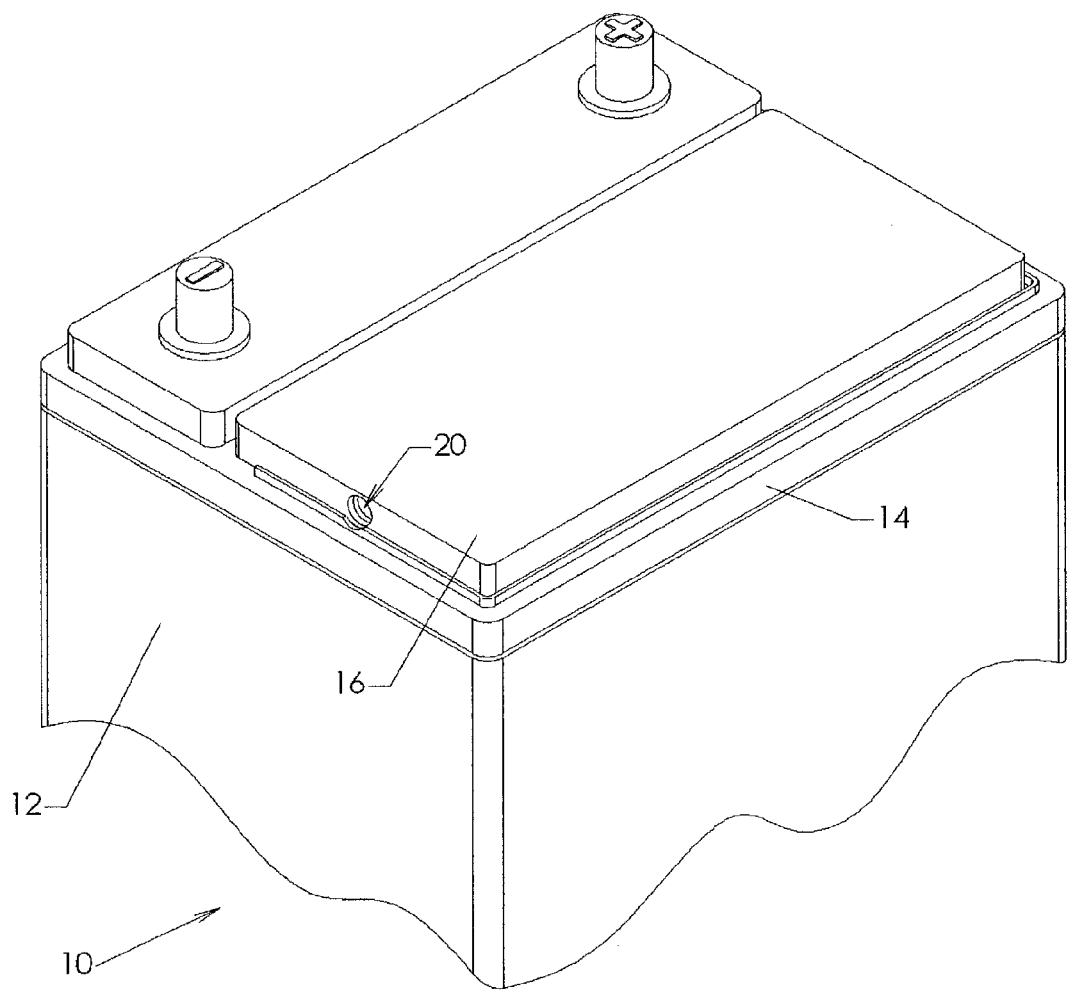
FIG. 1 is an isometric view of a battery with one embodiment of a cover having the features of the frit of the present invention.

The present invention is an improvement to the venting systems of batteries, especially the lead acid type battery that is commercially used in automotive vehicles. Recent changes in the automotive industry now require, in some instances, batteries to survive an inverted condition without damage to the vehicle or to the environment. A leading automobile manufacturer, BMW, leads the way with their internal standard.

Lead acid type batteries can build up pressure during charging and/or heat exposure. These batteries use a "frit" to provide a vent for the gases to relieve pressure. A "frit" is defined as a porous member that allows gases to escape though the frit in a vent opening while preventing the liquid (electrolyte) from escaping. The frit of choice is made from polytetrafluoroethylene (PTFE). Such a PTFE frit is described in U.S. Pat. No. 6,110,617, which is incorporated herein by reference. As set forth therein, a special frit is available under the trade name Permeon®, a product of Performance Plastics Products (3P). This is an unfilled, hydrophobic and relatively rigid PTFE material with an open structure which allows consistent permeation of vapors but not of liquids. The rigid, porous frit may have a flexural modulus of about 50,000 to about 90,000 lb/in$^2$. A suitable frit may have a thickness, as described in U.S. Pat. No. 6,110,913, of from about 0.08 inch to about 0.225 inch.

The voltage of the battery and the size of the battery casing are factors In the design of a frit. As voltage increases, generally so does size of the casing. As the size of the casing increases, the size of the vent opening generally increases. Therefore, no single frit is available to fit all batteries. The porosity or degree of permeation in the PTFE frit is predetermined by the BMW inverted condition test, I.e. there is no loss of liquid through the frit when the battery is positioned so that the liquid in the battery could but for the frit run out of the battery case through the vent opening.

A frit having the pre-determined porosity or degree of permeation for a specific battery having a known voltage is made by mixing PTFE with a swelling agent such as poly methyl methacrylate (PMMA) and a lubricant such as a hydrocarbon based solvent. A suitable solvent is the paraffin solvent Isopar sold by Exxon Chemical Company. Suitable frits may be made with PTFE using a mixture that varies between 1 wt % to 35 wt % PMMA and 1 wt % and 7 wt % Isopar. The thickness of the frit will depend on the design pressure buildup potential within the battery, I.e. the manufacturer sets a maximum pressure buildup for determining the thickness of the walls of the battery casing and other essential parameters of the battery. These pressures usually vary with the voltage of the battery. A 4 volt battery may have a 1 psi (68.94757 millibar) design pressure buildup whereas a 36 volt battery may have a 5 psi (344.74 millibar). It is evident that the design of the frit is to vent the buildup of gases and have permeation rates that will prevent pressure buildup above the design maximums set by the battery manufacturer; however, because of the demand that the frit can not be so permeable as to let any liquid escape, there may be pressure buildups during charging and/or heat exposure that cannot be accommodated by the permeation rates of the frit. When the pressure buildup exceeds a pre-determined pressure, about 5 to 10% of the design pressure maximum, it is necessary for the frit to blowout the vent opening rather than have the battery explode with potential risk of harm to people and property.

The present invention is directed to several embodiments of an improved venting system for a battery where a frit is placed in the vent opening of a battery that has two functions; namely, it acts to allow gases to escape while preventing liquid to escape and in addition acts as a blowout disk when a pressure within the battery exceeds a predetermined pressure that blows the frit out of the cover preventing the explosion of the battery.

Figure 2:
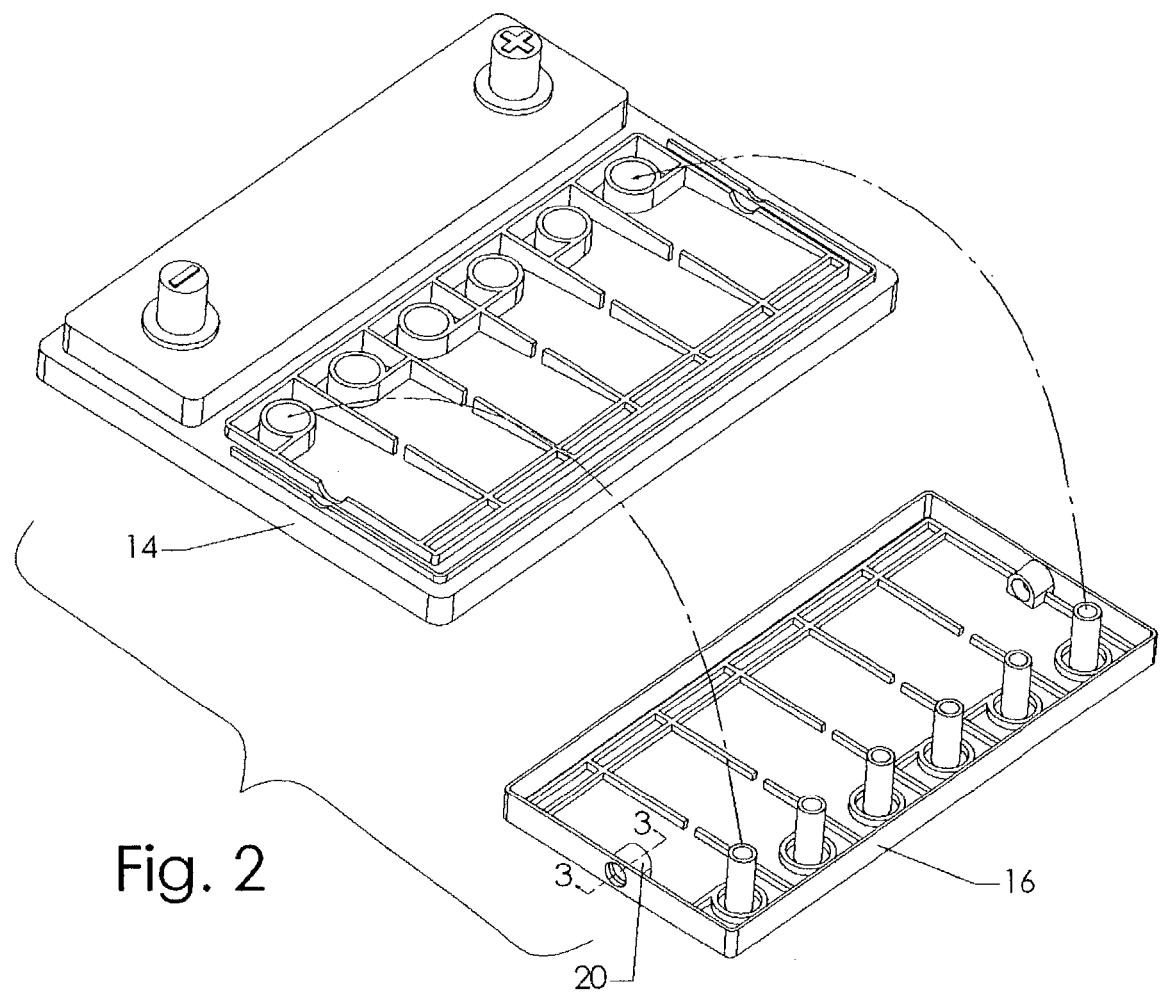
FIG. 2 is a perspective view of the battery cover removed from the battery shown in FIG. 1, and with the manifold cover removed from the battery cover.

Referring now to FIG. 1, a battery 10 is shown having a casing 12 and a cover 14 which is typically heat sealed to the casing 12. In this model of battery, the cover 14 has a manifold vent cover 16. In the cover 16 is a vent system 20 employing a frit 21 having the characteristics of the present invention. The details of the cover 16 and vent system 20 are illustrated in FIG. 2.

Figure 3:
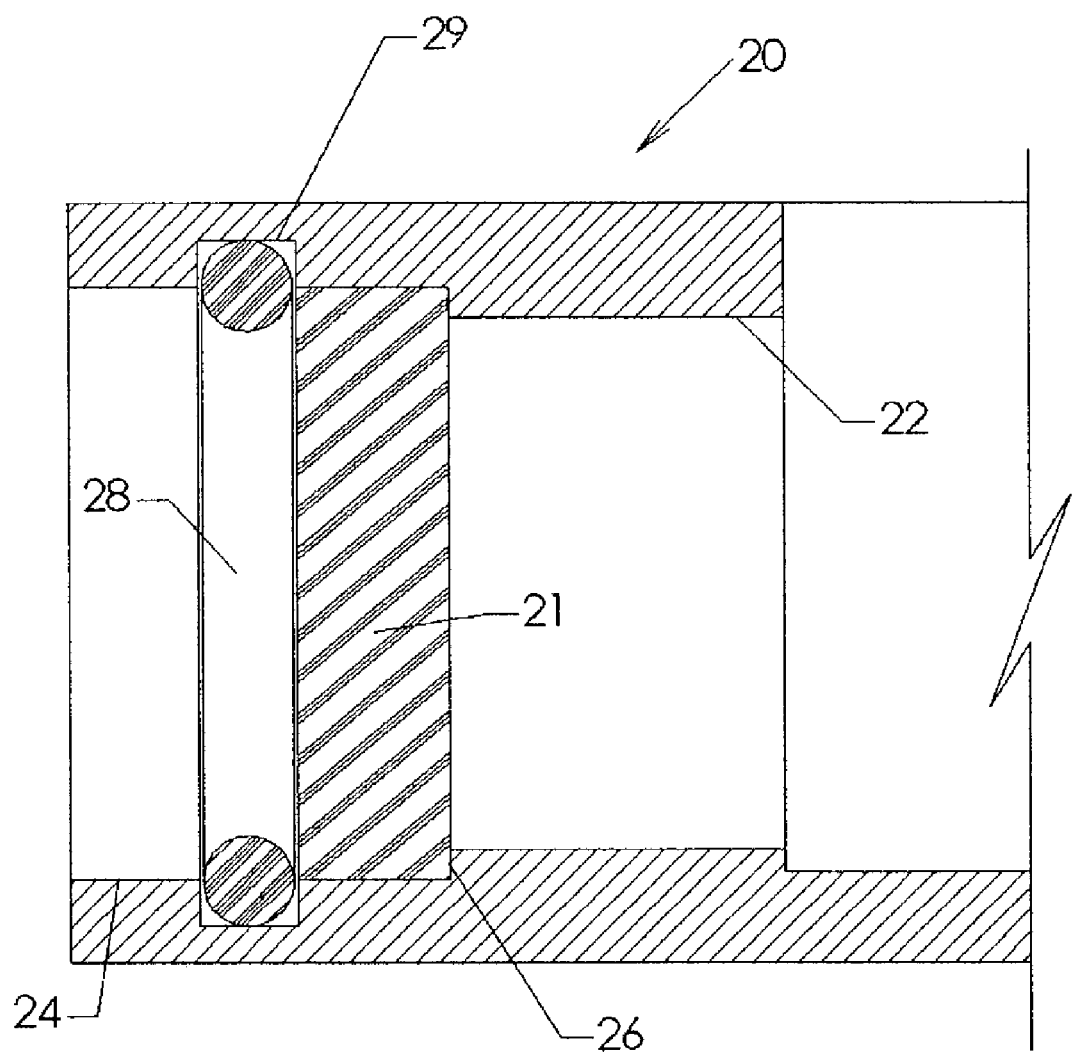
FIG. 3 is a cross-sectional view along line 3-3 in FIG. 2 illustrating one embodiment for restraining the frit of the present invention.
Figure 4:
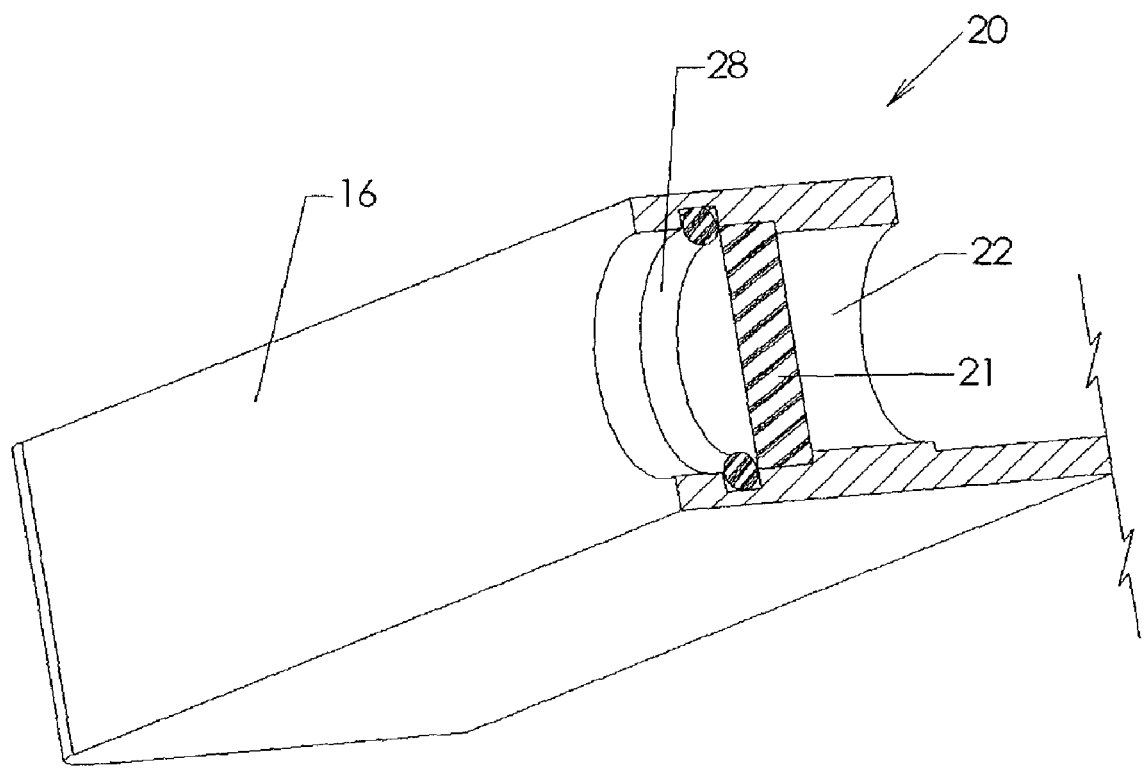
FIG. 4 is an isometric view of the manifold cover, partially in cross-section, illustrating that the specific structure restraining the frit is an O-ring.

The details of the vent system 20 are set forth in FIG. 3. The vent system 20 includes a passageway or opening 22 in the cover 16. Preferably, the injection molding of the cover 16 will provide the cylindrical opening 22, as well as a increased diameter portion 24 with a face 26. In this embodiment of the present invention, a frit 21 having the shape and diameter of portion 24 is placed in the opening 24 and against face 26. An O-ring 28 is placed in front of the frit 21 in a groove or cutout 29 to act as a restraining member for the frit 21 until the pressure in the battery exceeds the pre-determined blowout pressure that will force the frit 21 through the O-ring 28 to prevent an explosion of the battery. FIG. 4 shows the cross-section through the cover 16 with the frit 21 restrained in the vent system 20 by an O-ring 28.

Figure 5:
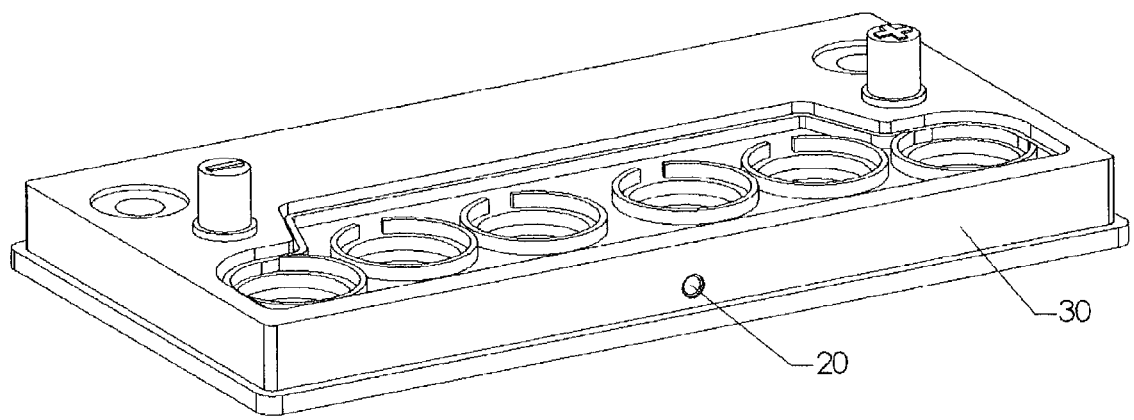
FIG. 5 is an isometric view of another embodiment of a battery cover having the features of the frit of the present invention.
Figure 6:
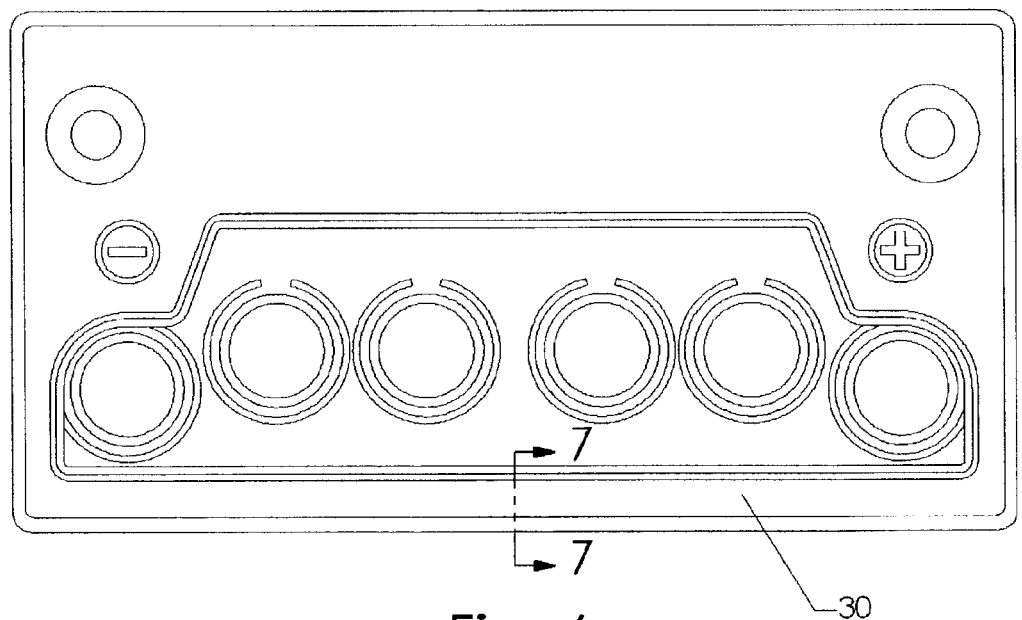
FIG. 6 is a top view of the battery cover shown in FIG. 5.
Figure 7:
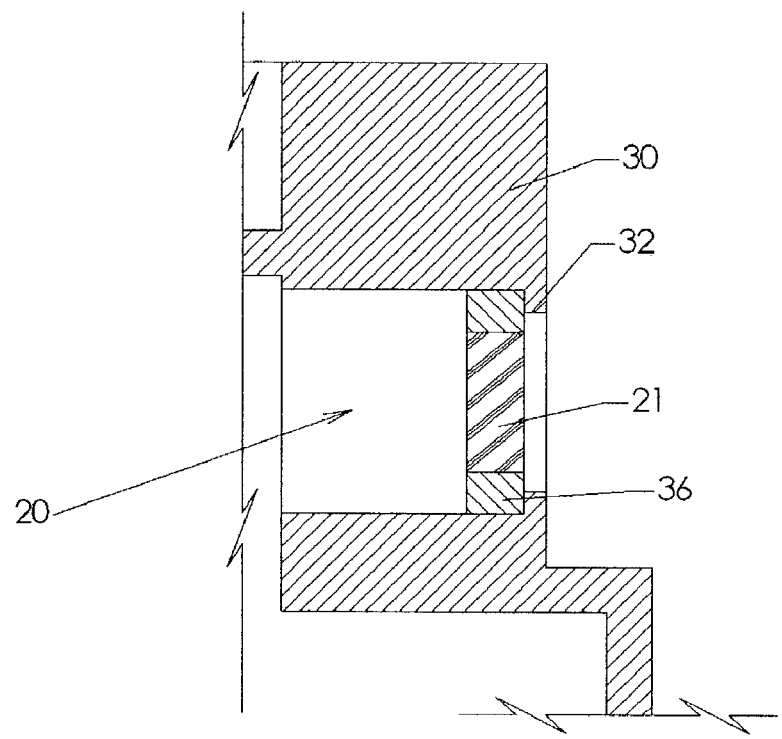
FIG. 7 is a cross-sectional view along line 7-7 in FIG. 6 and illustrates another embodiment for restraining the frit of the present invention.

Referring to FIGS. 5 and 6, another embodiment of a battery is shown. In this embodiment the vent system 20 is in a cover 30. Two additional restraining means are shown, FIG. 7 and FIG. 8 respectively, besides the use of an O-ring. Referring to FIG. 7, the battery cover 30 has a lip 32 to an opening 34 in the cover. In this embodiment, the frit 21 is molded or placed into a housing 36. The housing 36 is a cylindrical piece made of the same plastic material as the cover 30. A conventional material is polypropylene. The dimensions of the frit are such that when the blowout pressure is exceeded that the frit 21 will blow out of the housing 36.

Figure 8:
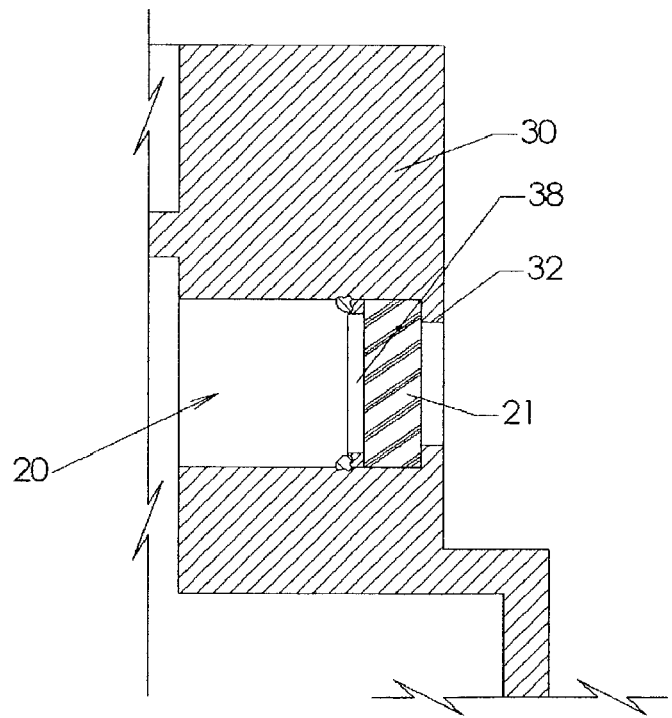
FIG. 8 is a cross-sectional view along line 7-7 in FIG. 6; however, it illustrates still another embodiment for restraining the frit of the present invention.

Referring now to FIG. 8, in this embodiment, the frit 21 is placed against the lip 32 of the battery cover 30. A retaining ring 38 may be placed behind the frit 21 to hold the frit 21 during normal operation. When the blowout pressure is exceeded, the frit 21 will break the lip 32 and be blown out the opening of the vent system 20.

While the invention has been described in connection with what is presently considered the preferred embodiments, it is to be understood that the invention is not limited to the disclosed embodiments, but on the contrary, is intended to cover various modifications and equivalent arrangements included within the spirit and scope of the appended claims.

The invention claimed is:

1. A lead acid battery cover adapted to seal an automotive vehicle battery casing having a design pressure maximum, the lead acid battery cover comprising:

a rigid, porous frit consisting of modified polytetrafluoroethylene, wherein the frit allows gases to escape while preventing liquid from escaping and acts as a blowout disk when a pressure within said automotive vehicle battery casing exceeds a predetermined pressure that blows said frit out of said lead acid battery cover, wherein the predetermined pressure is within 5% to 10% of the design pressure maximum of the automotive vehicle battery casing; and restraining means for holding said frit in said lead acid battery cover until said predetermined pressure is exceeded, wherein the modified polvtetrafluoroethylene comprises Polytetrafluoroethylene, from 1 wt % to 35 wt % PMMA and from 1 wt % to 7 wt % lubricant.

2. A lead acid battery cover according to claim 1 wherein said restraining means is an O-ring.

3. A lead acid battery cover according to claim 1 wherein said restraining means is a housing in which said frit is secured until said predetermined pressure is exceeded.

4. A lead acid battery cover according to claim 1 wherein said restraining means is a lip on said lead acid battery cover.

5. A lead acid battery cover adapted to seal an automotive vehicle battery casing having a design pressure maximum, the lead acid battery cover comprising:

a rigid, porous frit consisting of modified polytetrafluoroethylene, wherein the frit allows gases to escape while preventing liquid from escaping and acts as a blowout disk when a pressure within said automotive vehicle battery casing exceeds a predetermined pressure that blows said frit out of said lead acid battery cover, wherein the predetermined pressure is within 5% to 10% of the design pressure maximum of the automotive vehicle battery casing; and an O-ring for holding said frit in said lead acid battery cover until said predetermined pressure is exceeded blowing said frit out of said lead acid battery cover, wherein the modified polytetrafluoroethylene comprises polytetrafluoroethylene, from 1 wt % to 35 wt % PMMA and from 1 wt % to 7 wt % lubricant.

6. A battery cover according to claim 5 wherein said O-ring has a durometer between 70 and 80.

7. A lead acid battery cover according to claim 5 that comprises molded plastic.

8. A lead acid battery cover according to claim 6 wherein said molded plastic is polypropylene.

9. A lead acid battery cover adapted to seal an automotive vehicle battery casing having a design pressure maximum, the lead acid battery cover comprising:
a rigid, porous frit consisting of modified polytetrafluoroethylene, wherein the frit allows gases to escape while preventing liquid from escaping; and
a housing for holding said frit in said lead acid battery cover until a pressure within said battery casing exceeds a predetermined pressure that blows said frit out of said lead acid battery cover, wherein the predetermined pressure is within 5% to 10% of the design pressure maximum of the automotive vehicle battery casing,
wherein the modified polytetrafluoroethylene comprises polytetrafluoroethylene, from 1 wt % to 35 wt % PMMA and from 1 wt % to 7 wt % lubricant.

10. A lead acid battery cover according to claim 9 wherein the lead acid battery cover comprises a molded plastic.

11. A lead acid battery cover according to claim 10 wherein said molded plastic is polypropylene.

12. A lead acid battery cover for an automotive vehicle battery casing having a design pressure maximum the lead acid battery cover comprising:
a rigid, porous frit consisting of polytetrafluoroethylene, from 1 wt % to 35 wt % PMMA and from 1 wt % to 7 wt % lubricant, wherein the frit allows gases to escape while preventing liquid from escaping and acts as a blowout disk when a pressure within said automotive vehicle battery casing exceeds a predetermined pressure that blows said frit out of said lead acid battery cover, wherein the predetermined pressure is within 5% to 10% of the design pressure maximum of the automotive vehicle battery casing; and
a lip on said lead acid battery cover for holding said frit in said lead acid battery cover until a pressure within said automotive vehicle battery casing exceeds said predetermined pressure that blows said frit out of said lead acid battery cover.

13. A lead acid battery cover according to claim 12 that comprises molded plastic.

14. A lead acid battery cover according to claim 12 wherein said molded plastic is polypropylene.

15. A lead acid battery cover adapted to seal an automotive vehicle battery casing having a design pressure maximum, the lead acid battery cover comprising:
a cylindrical vent opening in said lead acid battery cover, and having a face in said cylindrical vent opening;
a rigid, porous frit consisting of modified polytetrafluoroethylene, wherein the frit allows gases to escape through said cylindrical vent opening while preventing liquids from escaping through said cylindrical vent opening seated on said face;
a groove in front of said frit containing an O-ring such that when a pressure within the automotive vehicle battery casing exceeds a predetermined pressure said frit is blown out of said cylindrical vent opening, wherein the predetermined pressure is within 5% to 10% of the design pressure maximum of the automotive vehicle battery casing,
wherein the modified polytetrafluoroethylene comprises polytetrafluoroethylene, from 1 wt % to 35 wt % PMMA and from 1 wt % to 7 wt % lubricant.

16. A method for making a lead acid battery, the method comprising:
providing a casing having a design pressure maximum,
providing a liquid within said casing, and
sealing the liquid within the lead acid battery with the lead acid battery cover of claim 1.

17. A method for preventing the explosion of a lead acid battery, in the event of a pressure buildup, the method comprising:
sealing a lead acid battery casing comprising a liquid with the lead acid battery cover of claim 1, wherein the casing has a design pressure maximum.

* * * * *